Patented July 31, 1934

1,968,724

UNITED STATES PATENT OFFICE 1,968,724

PROCESS FOR WATER PURIFICATION

Oliver M. Urbain, Columbus, Ohio, assignor to Charles H. Lewis, Harpster, Ohio

No Drawing. Application February 3, 1933, Serial No. 655,136

4 Claims. (Cl. 210—2)

The invention contemplates and has for its object the provision of an improved process for water purification.

It is known that organic polluting substances in water take the form of suspensoids, matter in suspension, colloids, matter in dispersion, and crystalloids, matter in true solution. While the process of the present invention functions to remove the suspensoids, it is primarily directed to the removal of the colloidal matter.

Experience has demonstrated that much of the so-called colloidal matter present in polluted waters is present in the form of solvated colloids, that is, the colloids having adsorbed on their surfaces a layer of water molecules.

It is a specific object of the present invention to provide an economical and efficient process for removing the solvated colloids from the water.

Solvated colloids are extremely stable against flocculation. They have two factors of stability, namely, hydration and potential. The elimination of either factor of stability will not result in the flocculation of the solvated colloid because the stability thereof is due to both factors of stability. To flocculate solvated colloids it is necessary to eliminate both factors of stability. It is of no importance which factor is eliminated first, as the solvated colloid will flocculate on the elimination of the remaining factor.

Ordinarily it is preferred to remove the solvating film of water from the colloids first and thus transform them into desolvated colloids. The desolvated colloids can be flocculated by a suitable electrolyte only when they carry a maximum charge. The present process, therefore, embraces three principal steps: First, the removal of the solvating water film from the solvated colloids to transform them into desolvated colloids; second, imparting to the desolvated colloids a maximum charge, and; third, the flocculation of the completely charged desolvated colloids by means of a suitable electrolyte.

Up to this time no economic process has been known for the desolvation of solvated colloids. The process now commonly in use consists of "salting out." This procedure requires enormous amounts of the "salting out" reagents and is of no value economically.

As an example of the varying quantities of reagents required to flocculate a non-solvated colloid, commonly known as a suspensoid, and a solvated colloid, one may take arsenious sulfide, a suspensoid, and agar agar, a solvated colloid. One millimol per liter of magnesium sulfate will flocculate arsenious sulfide, while one mol. per liter of the same salt is required to flocculate agar agar. In other words, one thousand times as much magnesium sulfate is required to flocculate agar agar as is required to flocculate arsenious sulfide. If, however, agar agar is first desolvated by my process, no more magnesium sulfate is required to flocculate the desolvated agar agar than is required to flocculate the suspensoid, arsenious sulfide.

When proteins are dispersed in water they become solvated colloids. They are organic in nature. The significance of the presence of such compounds or, rather, such substances in polluted waters, lies inherently in their effect on the biochemical oxygen demand of such waters, for the oxygen demand of such substances through biochemical agencies is very great. In other words, waters which contain such solvated colloids are highly putrescible.

The content of these solvated colloids in polluted liquid varies greatly. In normal municipal sewage the content thereof approximates 125 ppm., while in a liquid such as the waste from packing houses the content thereof may exceed 2500 ppm. Wastes such as that issuing from creameries, cheese factories, straw-board works, tanneries, sugar refineries, dye works, and the like, are high in solvated colloid content.

It is thus seen that the desolvation of solvated colloids incident to their flocculation, is a problem of great importance in water purification.

The three steps will be taken up in order.

The first step comprises the desolvation of the solvated colloid by the addition to the dispersion of an hydrous oxide.

An hydrous oxide is the positively charged colloid formed as a result of the hydrolysis of a metallic salt and consists of an addition compound of the hydroxide of the metal and the salt from which the hydroxide was derived. For example, if we prepare the hydrous oxide from stannic chloride by the hydrolysis of a solution of stannic chloride the hydrous oxide would have a composition as follows,—

$$[Sn(OH)_4]_x \cdot [SnCl_4]_y$$

If the hydrous oxide is derived from zinc chloride the constitution of the hydrous oxide is as follows:

$$[Zn(OH)_2]_x \cdot [ZnCl_2]_y$$

In every instance the numerical value of $x$ and $y$ varies with the pH of the solution in which the hydrolysis is taking place. The lower the pH the smaller will be the value of $x$ and the greater will be the value of $y$ and vice versa.

It should here be noted that only the salts of metals whose hydroxides are insoluble in water are capable of forming hydrous oxides. In preparing the hydrous oxides no salt should be selected whose anion has a valence greater than 1, because if the valence of the ion be greater than 1 the anion will, in most cases, flocculate the hydrous oxide as the hydrous oxide is being formed by the hydrolysis of the metallic salt.

Therefore, to sum up the conditions in general, only salts whose metals form hydroxides insoluble in water and whose anions have a valence of 1 are suitable for the formation of hydrous oxides for use in this process.

To form the hydrous oxides for use in this process, it is only necessary to hydrolize a solution of a suitable salt in the presence of a buffer which will maintain the pH of the solution slightly under 7.0. A good range of pH is from 6.0 to 6.9. Suitable buffers for this purpose are calcium carbonate and barium carbonate. The proper amount of buffer to use can be computed by computing the amount of bound acid in the amount of salt employed, and from this value, computing the amount of the carbonate required to react with the amount of bound acid found in the first computation. No excess of buffering material should be employed.

In general, it may be said that 1 ppm. of an hydrous oxide will desolvate 1 ppm. of solvated colloids.

The process thus far is carried out as follows: Determine the number of parts per million of the solvated colloids present in the water and add the equivalent number of parts per million of the hydrous oxide prepared under the instruction given above. Agitate approximately four minutes. At this juncture the solvated colloids will all be found to have been desolvated.

The second step in the process has to do with imparting to the desolvated colloids a maximum charge and maximum cataphoretic velocity.

It has heretofore been proposed to effect a complete negative charging of colloids dispersed in water by the addition of calcium hydroxide until the solution attains a pH of 9.5 or over. This procedure, however, requires large quantities of calcium hydroxide, the quantity varying from 1000 to 3000 pounds per million gallons, depending upon the water.

It has been found that relatively small quantities of water soluble, or partially soluble polycyclic compounds or anions of salts of polycyclic acids will function to increase the charge and the cataphoretic velocity of colloids to a maximum. It is understood, of course, that only reagents will be selected which are sufficiently soluble in water to permit of concentration of the required quantity of the reagent.

The anions of the salts of polycyclic acids are somewhat more efficient than the non-dissociated polycyclic compounds, because they combine the negative properties of the anions with the polycyclic structure of the parent acid.

The increase of the charge and cataphoretic velocity of the colloid is due to the absorption by the colloid of the polycyclic compound or the polycyclic anion as the case may be. The great absorbability of such compounds is due, no doubt, to the fact that they contain many double bonds which are in a state of vibration and are pointed inward into the center of the molecule and that with the double bond is associated induced polarity and, consequently, points of unequal reactivity. It should here be noted that the open chain compounds are unsuited for use in the applicant's process because they are not noticeably absorbed.

With respect to the polycyclic acids, the univalent salts of these acids are preferred for they give on ionization the polycyclic anions which are more strongly negative than the parent polycyclic compound, that is, exhibit greater electrical potential. Acids of the polycyclic compounds may be considered as formed by the replacement of hydrogen atoms of the polycyclic compound by, a carboxyl group or a sulfonic acid group ($-SO_3H$) or a sulfinic acid group ($-SO_2H$) or a sulfenic acid group ($-SOH$) or an arsonic acid group

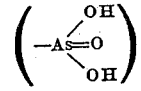

or a phosphonic acid group ($-PO_4H_2$). The univalent salts of the polycyclic acids are preferred to the higher valent salts because of the lesser antagonism of the univalent metals.

All of the acids noted above replace carbonic acid in sodium carbonate. Hence, to obtain the sodium salt, it is only necessary to add to the acid the sodium carbonate in gram molecular equivalents. On ionization the sodium salts so found yield the polycyclic anion which not only possesses the properties of the parent polycyclic compound but the electrical potential properties of a negative ion.

I have found that in my process the isomers of the polycyclic compound are equally effective and that the position of the acid residue on the benzine ring is of no importance. I have further ascertained that valence is unimportant since, while higher valent salts give better results than lower valent salts, the difference is only proportional to the higher molecular weight of the higher valent salts.

Exemplary polycyclic compounds or salts of polyclic acids for use in this process are, the sodium salts of naphthalene sulfonic acid, carminic acid and diphenic acid and naphthoquinone.

The quantity of the polycyclic compound necessary to effect complete charging and maximum cataphoretic velocity of all colloids in any particular dispersion will depend upon the colloidal concentration therein. For example, in treating a solution having a colloidal concentration of 150 parts per million and using any of the above polycyclic compounds, the quantity should be from 200 to 400 pounds per million gallons treated. The exact quantity of reagent required can be determined by adding a solution of the reagent to the colloidal dispersion in increasing amounts and determining the point, by cataphoretic measurement, at which the colloid reaches its maximum cataphoretic velocity. Any of the conventional methods of cataphoretic measurements may be used for measuring the cataphoretic velocity.

The second step of the process may be carried out as follows: Determine the amount of a polycyclic compound or the amount of a univalent metal salt of a polycyclic acid, required to bring the colloids to a state of maximum cataphoretic velocity, and the required amount of reagent thus determined and agitate from three to four minutes. At this juncture in the process all colloids are desolvated and have a maximum charge and maximum cataphoretic velocity, a state in which they are in proper condition for clean-cut flocculation by means of a suitable electrolyte.

The third step of the process is concerned with the flocculation of the desolvated completely charged colloids. Suitable electrolytes for use in this step of the process are those which have a cation of a valence of two or more and an anion of a valence of one. Other suitable electrolytes are those having a cation with a valence greater by two or more than the valence of the anion.

As suspensoids are extremely sensitive to minute quantities of such electrolytes it follows that the addition of relatively small quantities of such electrolytes will effect the complete and rapid flocculation of the suspensoids. Examples of suitable electrolytes for use in the process are calcium chloride, zirconium chloride, and zirconium sulfate.

The amount of electrolyte required for the various wastes will vary from 50 pounds to 250 pounds per million gallons of water treated. The exact amount of electrolyte required in any instance may be determined by adding a M/10 solution of the electrolyte to a definite volume of waste in increasing amounts until flocculation is exhibited. The amount of the electrolyte required per million gallons of waste treated may then be computed from the data so obtained.

In most cases, and if the work has been properly done, the flocculation will be complete and rapid and no coagulant will be required. The flocculated material may be removed effectively by sedimentation.

While the present process is primarily a water purification process, it has many other adaptations and may advantageously be used in many manufacturing processes for the elimination of undesirable solvated colloids encountered in these processes.

Having thus described my invention what I claim is:—

1. A process of water purification comprising treating water containing solvated colloids with a reagent capable of desolvating the colloids, imparting a maximum charge to the desolvated colloids and then flocculating the same with a suitable electrolyte.

2. A process of water purification comprising treating water containing solvated colloids with an hydrous oxide of a di or higher valent metal to desolvate the colloids, imparting a maximum charge to the desolvated colloids by incorporating in the water a soluble polycyclic compound and flocculating the charged colloids with a suitable electrolyte.

3. A process of water purification comprising treating water containing solvated colloids with an hydrous oxide, the hydrous oxide being employed weight for weight of the solvated colloids, imparting to the desolvated colloids a maximum charge by treating the water with a soluble salt of a polycyclic acid in effective amounts accompanied by agitation for from three to four minutes, and finally flocculating the charged colloids with a suitable electrolyte.

4. A process of water purification comprising treating water containing solvated colloids with hydrous ferric oxide, the hydrous ferric oxide being employed weight for weight of the solvated colloids, imparting to the desolvated colloids a maximum charge by treating the water with a soluble salt of a polycyclic acid in effective amounts accompanied by agitation for from three to four minutes, and finally flocculating the charged colloids with a suitable electrolyte.

OLIVER M. URBAIN.